United States Patent
Kim et al.

(10) Patent No.: US 8,927,109 B2
(45) Date of Patent: Jan. 6, 2015

(54) REINFORCED WOOD FLOORING AND METHOD FOR MANUFACTURING SAME

(75) Inventors: Ji Woong Kim, Cheongju-si (KR); H. C. Jang, Goyang-si (KR)

(73) Assignee: LG Hausys, Ltd., Seoul (KR)

( * ) Notice: Subject to any disclaimer, the term of this patent is extended or adjusted under 35 U.S.C. 154(b) by 120 days.

(21) Appl. No.: 13/512,106

(22) PCT Filed: Nov. 22, 2010

(86) PCT No.: PCT/KR2010/008258
§ 371 (c)(1),
(2), (4) Date: May 25, 2012

(87) PCT Pub. No.: WO2011/065714
PCT Pub. Date: Jun. 3, 2011

(65) Prior Publication Data
US 2012/0315452 A1 Dec. 13, 2012

(30) Foreign Application Priority Data
Nov. 27, 2009 (KR) .................. 10-2009-0115777

(51) Int. Cl.
*B32B 23/04* (2006.01)

(52) U.S. Cl.
USPC ........ 428/532; 428/535; 428/536; 428/537.1; 428/537.5

(58) Field of Classification Search
USPC .................. 428/532, 535, 536, 537.1, 537.5
See application file for complete search history.

(56) References Cited

U.S. PATENT DOCUMENTS

2006/0234009 A1  10/2006  Roh et al.
2012/0276348 A1*  11/2012  Clausi et al. .................. 428/196

FOREIGN PATENT DOCUMENTS

| CN | 2126269 U | 12/1992 |
| CN | 2517814 Y | 10/2002 |
| EP | 1869269 A1 | 12/2007 |
| JP | 2006-514187 | 4/2006 |
| JP | 2007-313889 | * 12/2007 |
| JP | 2008-238425 A | 10/2008 |
| JP | 2009-131993 A | 6/2009 |
| JP | 2009-274286 A | 11/2009 |
| KR | 10-2005-0009938 A | 1/2005 |
| KR | 10-2006-0005011 A | 1/2006 |
| KR | 10-2006-0026664 A | 3/2006 |
| KR | 10-2007-0014510 A | 2/2007 |
| KR | 10-2008-0049433 A | 6/2008 |
| KR | 10-2008-0069896 A | 7/2008 |
| KR | 10-2009-0006503 A | 1/2009 |

* cited by examiner

*Primary Examiner* — Leszek Kiliman
(74) *Attorney, Agent, or Firm* — Nath, Goldberg & Meyer; Joshua B. Goldberg; Sanjana Mangalagiri

(57) ABSTRACT

Reinforced wood flooring according to one embodiment includes: a surface layer having a plurality of wood sheets and a resin-impregnated paper sheet interposed between the wood sheets, in which each of the wood sheets has a predetermined thickness and a plate shape, and the wood sheets and the resin-impregnated paper sheets are bonded together into a unitary body through hot-pressing; an adhesive layer formed beneath the surface layer to serve as an adhesive; and a plywood arranged beneath the adhesive layer and attached to a lower side of the surface layer by the adhesive lay.

3 Claims, 4 Drawing Sheets

REINFORCED WOOD FLOORING AND METHOD FOR MANUFACTURING SAME

TECHNICAL FIELD

The present invention relates to reinforced wood flooring, and more particularly to reinforced wood flooring, which does not crack even when used with under floor heating while maintaining an outer appearance of the wood flooring and has a reinforced surface, and a method for manufacturing the same.

BACKGROUND ART

Generally, flooring construction in a living room of an apartment, house or the like has become more common.

Most flooring currently constructed and in use is formed by adhering a wood veneer to a top surface of plywood, to which thin wood sheets are bonded in a zigzag pattern by adhesives to prevent the flooring from warping after installation.

However, wood flooring with wood sheets having a thickness of 1.5 mm or more on the surface thereof has a pleasant appearance, but has a problem in that the surface of the wood flooring is burst through repeated contraction and expansion resulting from under floor heating.

Further, the wood sheet itself has poor strength and thus is vulnerable to chopping, denting, and the like in use.

DISCLOSURE

Technical Problem

Some embodiments of the present invention provides reinforced wood flooring and a method for manufacturing the same, in which a phenol or melamine-impregnated paper sheet is interposed between multi-ply wood sheets and subjected to hot press bonding to have a thin thickness such that the wood flooring is not affected by contraction/expansion in use, thereby preventing surface cracking of the wood sheet while providing an outer appearance similar to that of a thick wood flooring.

In addition, some embodiments of the present invention provide reinforced wood flooring and a method for manufacturing the same, in which paper sheets impregnated with a resin (phenol/melamine resin) and press-bonded between wood sheets serve as a reinforcing layer (barrier layer) to thereby improve resistance to scratch or denting.

However, the problems to be solved by the present invention are not limited to the foregoing problems, and other problems not mentioned above can also be clearly understood by those skilled in the art from the following disclosures.

Technical Solution

In accordance with an aspect of the present invention, a reinforced wood flooring includes: a surface layer having a plurality of wood sheets and a resin-impregnated paper sheet interposed between the wood sheets, in which each of the wood sheets has a predetermined thickness and a plate shape, and the wood sheets and the resin-impregnated paper sheets are bonded together into a unitary body through hot-pressing; an adhesive layer formed beneath the surface layer to serve as an adhesive; and a plywood arranged beneath the adhesive layer and attached to a lower side of the surface layer by the adhesive layer.

The wood sheet may have a thickness ranging from 0.3 mm to 1.0 mm.

The resin-impregnated paper sheet may be a phenol-impregnated paper sheet or a melamine-impregnated paper sheet.

The reinforced wood flooring may further include a UV coating layer formed on top of the surface layer.

In accordance with another aspect of the present invention, a method for manufacturing reinforced wood flooring includes: preparing a plurality of wood sheets each having a predetermined thickness and a plate shape; interposing a resin-impregnated paper sheet between the wood sheets; forming a surface layer by bonding the wood sheets and the resin-impregnated paper sheet through hot-pressing; forming an adhesive layer serving as an adhesive on top of the plywood; and arranging the surface layer on the adhesive layer to bond the surface layer to the top of the plywood.

The above and other aspects, features, and advantages of the invention will become apparent from the detailed description of the following embodiments in conjunction with the accompanying drawings. It should be understood that the present invention is not limited to the following embodiments and may be embodied in different ways, and that the embodiments are given to provide complete disclosure of the invention and to provide a thorough understanding of the invention to those skilled in the art. The scope of the invention is defined only by the claims. Like components will be denoted by like reference numerals throughout the specification.

Advantageous Effects

In accordance with one embodiment of the present invention, a phenol or melamine-impregnated paper sheet is interposed between multi-ply wood sheets and subjected to hot press bonding to have a thin thickness such that the wood flooring is not affected by contraction/expansion in use, thereby preventing surface cracking of the wood sheet while providing an outer appearance like a thick wood flooring.

In accordance with another embodiment of the present invention, the paper sheet impregnated with a resin (phenol/melamine resin) and press-bonded between the wood sheets serves as a reinforcing layer (barrier layer) to improve resistance to scratch or denting.

In accordance with one embodiment of the present invention, a UV coating layer is formed on the surface, so that surface strength can be improved, a surface pattern can be protected, and the surface can be kept clean for a long time.

DESCRIPTION OF REFERENCE NUMERALS OF MAIN PARTS IN THE DRAWINGS

110: Surface layer
111: Wood sheet
112: Resin-impregnated paper sheet
120: Adhesive layer
130: Plywood
140: UV coating layer

BEST MODE

Next, exemplary embodiments according to the present invention will be described in detail with reference to accompanying drawings.

Figure 1:
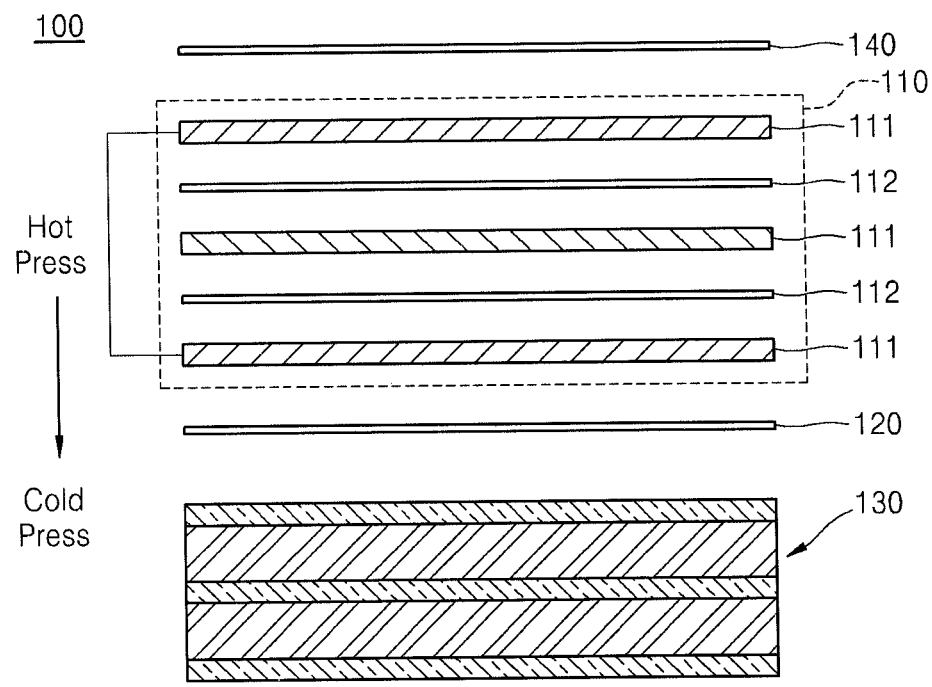
FIG. 1 is an exploded side view of reinforced wood flooring in accordance with one exemplary embodiment of the present invention.
Figure 2:
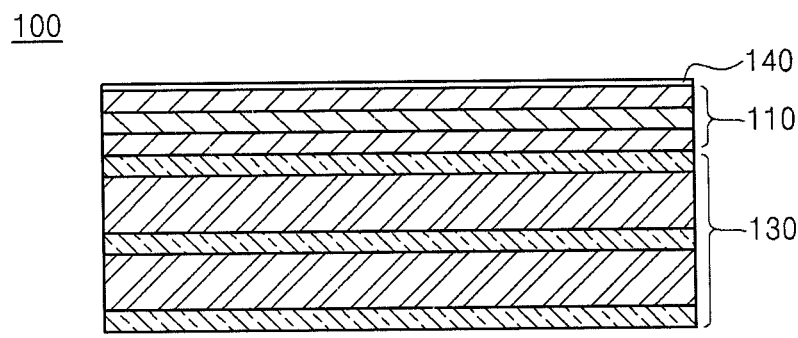
FIG. 2 is a side view of the reinforced wood flooring in accordance with the exemplary embodiment of the present invention.

FIG. 1 is an exploded side view of reinforced wood flooring in accordance with one exemplary embodiment, and FIG. 2 is a side view of the reinforced wood flooring in accordance with the exemplary embodiment.

Referring to FIGS. 1 and 2, the reinforced wood flooring 100 according to the embodiment includes a surface layer 110, an adhesive layer 120, and plywood 130.

The surface layer 110 includes a plurality of wood sheets 111, and a resin-impregnated paper sheet 112 interposed between the wood sheets 111.

Each of the wood sheets 111 has a predetermined thickness and a plate shape. For example, each wood sheet 111 may have a thickness ranging from 0.3 mm to 1.0 mm.

Each of the wood sheets 111 is formed within this thickness range, so that the wood flooring is minimally influenced by scratch or denting and is prevented from cracking due to contraction or expansion of the wood sheets 111 by under floor heating.

For reference, the wood sheet refers to a lumber thinly sawn like paper, and serves as a decorative material for representing naturalness and a showy pattern of wood.

The wood sheet 111 may be selected from a group consisting of natural pattern wood, dyed pattern wood, and glued laminated wood. For reference, the natural pattern wood is a wood sheet to which physical and chemical treatment is not applied, the dyed pattern wood is a wood sheet dyed after decoloration through chemical treatment of the wood sheet, and the glue laminated wood is a wood sheet reconstructed by physically treating the natural pattern wood.

The resin-impregnated paper sheet 112 is interposed between the wood sheets 111. The resin-impregnated paper sheet 112 serves not only as a reinforcing material for the wood sheets 111, but also as an adhesive for bonding the wood sheets 111 to each other.

To this end, the resin-impregnated paper sheet 112 may be composed of one material selected from among the phenol-impregnated paper sheet and the melamine-impregnated paper sheet. The phenol-impregnated paper sheet or the melamine-impregnated paper sheet is a representative material used as an overlay of the reinforced flooring, and thus reinforces the wood sheets 111 when interposed between the wood sheets 111.

In addition, since the phenol-impregnated paper sheet or the melamine-impregnated paper sheet exhibits excellent adhesion when subjected to hot pressing, the phenol-impregnated paper sheet or the melamine-impregnated paper sheet improves adhesive strength of the wood sheets 111 when interposed between the wood sheets 111.

The phenol-impregnated paper sheet or the melamine-impregnated paper sheet may contain one or more selected from the group consisting of aluminum oxide, ceramics and nano ceramics in order to improve wear resistance When the phenol-impregnated paper sheet is used as the resin-impregnated paper sheet 112, the phenol-impregnated paper sheet may be composed of a phenol adhesive sheet. When the melamine-impregnated paper sheet is used as the resin-impregnated paper sheet 112, the melamine-impregnated paper sheet may be composed of a melamine adhesive sheet.

A process for forming the resin-impregnated paper sheet 112 is broadly divided into two operations, i.e., resin (phenol or melamine) impregnation and drying. When aluminum oxide is used to enhance wear resistance, a process of injecting aluminum oxide may be performed between resin impregnation and drying.

As such, in this embodiment of the invention, the wood sheets 111 and the resin-impregnated paper sheet 112 are bonded together into a unitary body through hot-pressing such that the resin-impregnated paper sheet 112 is pressed and bonded between the wood sheets 111, thereby increasing strength of the wood sheets 111.

According to the embodiment, for example, each of the wood sheets 111 is formed to a thickness of 0.5 mm, whereby contraction or expansion of the wood sheets 111 can be decreased as compared with conventional flooring materials, thereby preventing the surfaces of the wood sheets 111 from cracking.

The adhesive layer 120 is formed on the plywood 130. The adhesive layer 120 serves as an adhesive for bonding the surface layer 110 to the plywood 130.

Such an adhesive layer 120 may be composed of an adhesive containing a material selected from among Poly Vinyl Acetate (PVAc), Ethylene Vinyl Acetate (EVA), EPI (Emulsified Poly Isocyanate), and polyurethane (PU), without being limited thereto.

Further, the adhesive layer 120 may be composed of a room-temperature and thermosetting 2-liquid type synthetic resin adhesive, which is a water-soluble bonding agent, does not create environmental pollution and exhibits good water-proofing and heat-resistance.

The plywood 130 is arranged beneath the adhesive layer 120. The plywood 130 is bonded to a lower side of the surface layer 110 by the adhesive layer 120.

For reference, the plywood refers to a plate in which an odd number of thin wood plates, i.e., veneers, are bonded by an adhesive while being stacked such that their fiber directions intersect each other.

In some embodiments, the reinforced wood flooring 100 may further include a UV coating layer 140.

The UV coating layer 140 is formed on the top of the surface layer 110, i.e., on the top of the uppermost wood sheet 111 through UV coating.

Next, an example of a process for forming the UV coating layer 140 will be described. First, a UV paint is applied to the surface of the surface layer 110 by roll coating, and dried several times by a UV hardener, such that the UV coating layer 140 can be formed to a uniform thickness on the surface of the surface layer 110.

As the UV coating layer 140 is formed on top of the surface layer 110, surface strength of the surface layer 110 is improved, the pattern of the wood sheet 110 is protected, and the surface layer 110 is maintained clean for a long time.

Also, minute grooves on the surface of the surface layer 110 are fully filled with the UV coating material, the surface exposed to the outside in use is protected, and the surface of the wood flooring looks smooth and flat.

The following table 1 shows physical properties of the reinforced wood flooring according to an exemplary embodiment and conventional wood flooring.

TABLE 1

| Sort | Size stability (%) | | | | Warp stability (mm) | | | | | | Impact strength (mm) |
|---|---|---|---|---|---|---|---|---|---|---|---|
| | High temperature at 80° C. | | | | Initial state | | High temperature of 80° C. | | | | |
| | Breadth | | Length | | | | Breadth | | Length | | |
| | 6 hours | 24 hours | 6 hours | 24 hours | Breadth | Length | 6 hours | 24 hours | 6 hours | 24 hours | |
| Reinforced wood flooring | −0.02 | −0.03 | −0.20 | −0.26 | 0.00 | 0.41 | 0.02 | 0.02 | 1.90 | 2.67 | 350 |
| Conventional wood flooring | −0.03 | −0.05 | −0.21 | −0.25 | 0.00 | −0.43 | 0.02 | 0.02 | 2.53 | 1.92 | 200 |

As shown in Table 1, the experiment showed that size stability and warp stability (breadth and length) of the reinforced wood flooring 100 according to the exemplary embodiment were maintained at approximately the same level as those of the conventional wood flooring over a long time (6 hours, 24 hours) at high temperature of 80° C.

Further, the experiment showed that the conventional wood flooring suffered from surface cracking at a height of 200 mm or more, but the reinforced wood flooring 100 according to the embodiment had surface cracking at a height of 350 mm or more and thus had improved impact strength.

For reference, impact strength refers to a height, at which cracking, destruction, delamination, or the like are not shown even when a spherical weight of 286 g falls onto a surface of a test target.

Figure 3:
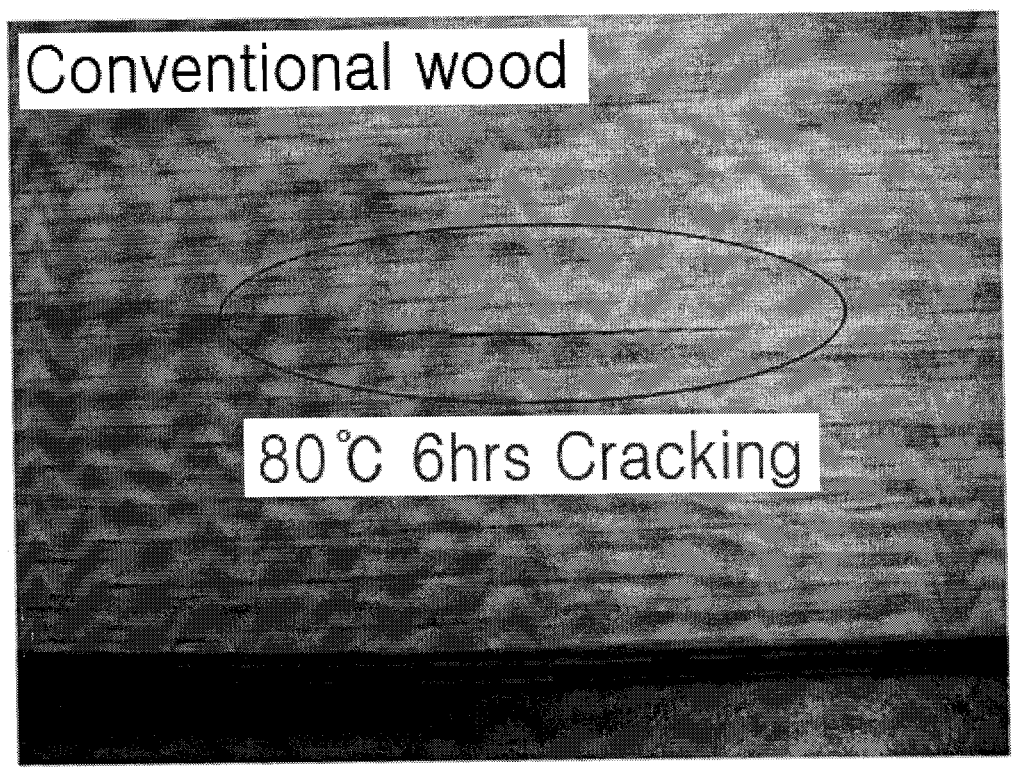
FIG. 3 is a view of an example of a cracking experiment of conventional wood flooring due to heating.
Figure 4:
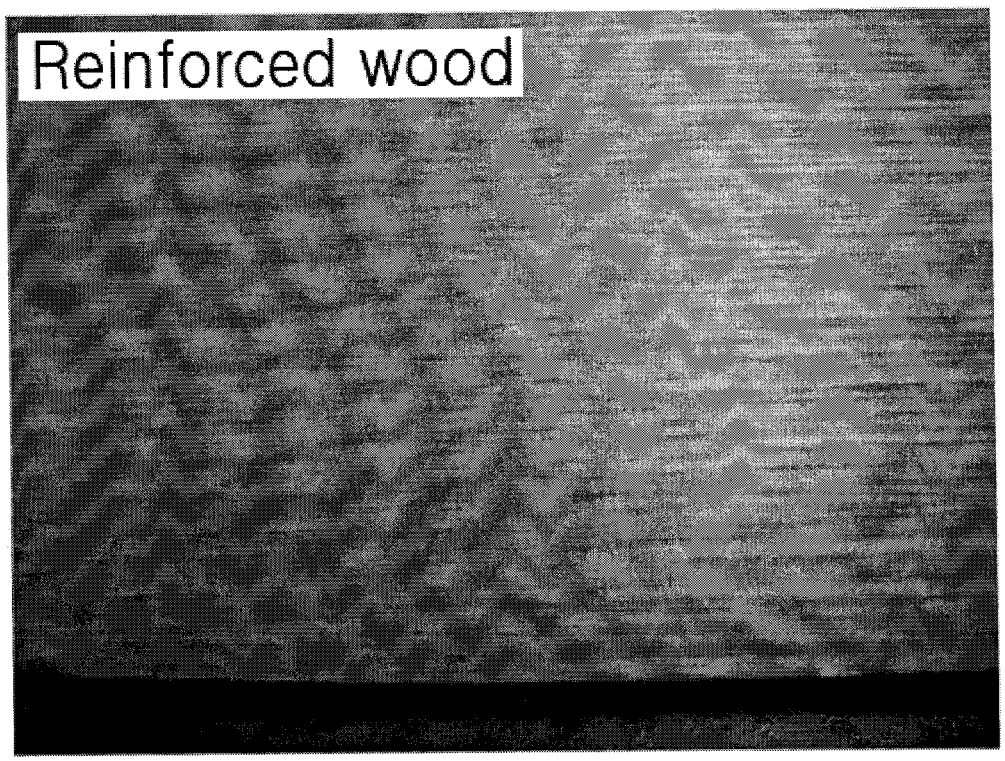
FIG. 4 is a view of an example of a cracking experiment of reinforced wood flooring in accordance with an exemplary embodiment of the present invention due to heating.

FIG. 3 is a view of an example of a cracking experiment of conventional wood flooring due to heating, and FIG. 4 is a view of an example of a cracking experiment of reinforced wood flooring in accordance with an exemplary embodiment of the present invention due to heating.

First, as shown in FIG. 3, the conventional wood flooring exhibited cracking after 6 hours at a high temperature of 80° C.

On the other hand, as shown in FIG. 4, the reinforced wood flooring 100 according to the embodiment exhibited no cracking even after 6 hours at a high temperature of 80° C.

As such, in the embodiments, a phenol or melamine-impregnated paper sheet is interposed between multi-ply wood sheets and subjected to hot press bonding to have a thin thickness such that the wood flooring is not affected by contraction/expansion in use, thereby preventing surface cracking of the wood sheet while providing an outer appearance similar to that of a thick wood flooring.

In accordance with the embodiments of the invention, the paper sheet impregnated with a resin (phenol/melamine resin) and press-bonded between the wood sheets serves as a reinforcing layer (barrier layer) to thereby improve resistance to scratch or denting.

Figure 5:
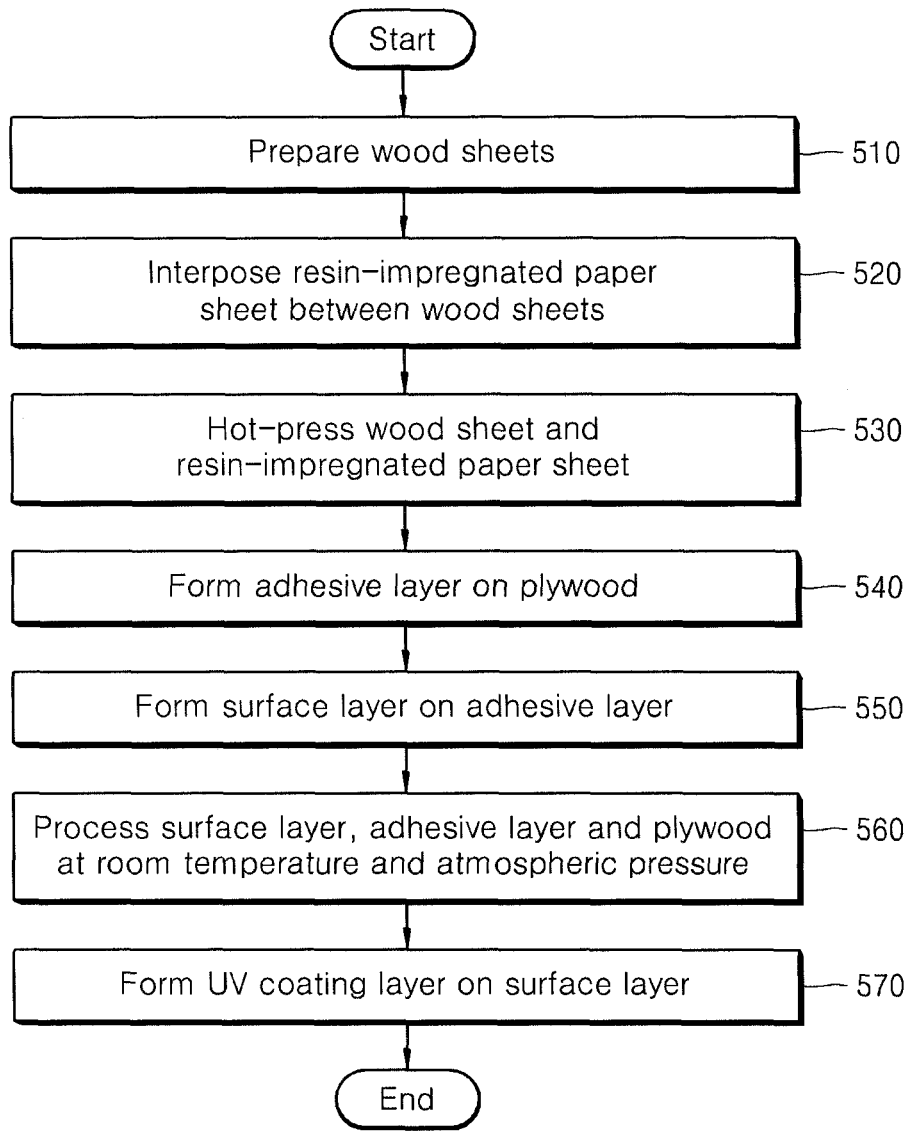
FIG. 5 is a flowchart of a method of manufacturing reinforced wood flooring in accordance with one exemplary embodiment of the present invention.

FIG. 5 is a flowchart of a method of manufacturing reinforced wood flooring in accordance with one exemplary embodiment of the present invention.

Referring to FIGS. 1 and 5, in operation 510, a plurality of wood sheets 111 having a predetermined thickness and a plate shape is prepared.

Each of the wood sheets 111 has a predetermined thickness and a plate shape. For example, each wood sheet 111 may have a thickness ranging from 0.3 mm to 1.0 mm.

Each of the wood sheets 111 is formed within this thickness range, so that the wood flooring is minimally influenced by scratch or denting and is prevented from cracking due to contraction or expansion of the wood sheets 111 by under floor heating.

Next, in operation 520, a resin-impregnated paper sheet 112 is interposed between the wood sheets 111.

The resin-impregnated paper sheet 112 serves not only as a reinforcing material for the wood sheets 111, but also as an adhesive for bonding the wood sheets 111 to each other.

To this end, the resin-impregnated paper sheet 112 may be composed of one material selected from among the phenol-impregnated paper sheet and the melamine-impregnated paper sheet. The phenol-impregnated paper sheet or the melamine-impregnated paper sheet is a representative material used as an overlay of the reinforced flooring, and thus reinforces the wood sheets 111 when interposed between the wood sheets 111.

In addition, since the phenol-impregnated paper sheet or the melamine-impregnated paper sheet exhibits excellent adhesion when subjected to hot pressing, the phenol-impregnated paper sheet or the melamine-impregnated paper sheet improves adhesive strength of the wood sheets 111 when interposed between the wood sheets 111.

A process for forming the resin-impregnated paper sheet 112 is broadly divided into two operations, i.e., resin (phenol or melamine) impregnation and drying. When aluminum oxide is used to enhance wear resistance, a process of injecting aluminum oxide may be performed between resin impregnation and drying.

Next, in operation 530, the wood sheet 111 and the resin-impregnated paper sheet 112 are bonded through hot-pressing, thereby forming a surface layer 110.

Next, in operation 540, an adhesive layer 120 serving as an adhesive is formed on the plywood 130.

At this time, the adhesive layer 120 may be composed of an adhesive containing a material selected from among Poly Vinyl Acetate (PVAc), Ethylene Vinyl Acetate (EVA), EPI (Emulsified Poly Isocyanate), and polyurethane (PU), without being limited thereto.

The adhesive layer 120 may be composed of a room-temperature and thermosetting 2-liquid type synthetic resin adhesive, which is a water-soluble bonding agent, does not create environmental pollution and exhibits good water-proofing and heat-resistance.

Next, in operation 550, the surface layer 110 is arranged on the adhesive layer 120.

Next, in operation 560, the surface layer 110, the adhesive layer 120, and the plywood 130 are processed at room temperature and atmospheric pressure, such that the surface layer 110 can be bonded to the top of the plywood 130.

Next, in operation 570, an UV coating layer 140 is formed on the surface layer 110.

The process for forming the UV coating layer 140 is as follows. First, a UV paint is applied to the surface of the surface layer 110 by roll coating, and dried several times using a UV hardener, such that the UV coating layer 140 can be formed to a uniform thickness on the surface of the surface layer 110.

Although some exemplary embodiments have been described with reference to the accompanying drawings, the invention may be embodied in many different ways and should not be construed as being limited to the embodiments set forth herein. Therefore, it should be appreciated that the foregoing embodiments are provided for illustrative purposes only and are not to be in any way construed as limiting the present invention.

As such, the embodiments and the accompanying drawings should not be construed as limiting the technical spirit of the present invention, but should be construed as illustrating the technical spirit of the present invention. It will be understood by those skilled in the art that various modifications, changes, alterations, and equivalent embodiments can be made without departing from the spirit and scope of the invention. Therefore, the scope of the invention should be interpreted according to the following appended claims as covering all modifications or variations derived from the appended claims and equivalents thereof.

The invention claimed is:

1. A reinforced wood flooring comprising:
   a surface layer including a plurality of wood sheets and a resin-impregnated paper sheet interposed between the wood sheets, each of the wood sheets having a predetermined thickness and a plate shape, the wood sheets and the resin-impregnated paper sheets being bonded together into a unitary body through hot-pressing, the resin-impregnated paper sheet having one or more selected from a group consisting of aluminium oxide, ceramics, and nano ceramics;
   an adhesive layer formed beneath the surface layer to serve as an adhesive;
   a plywood arranged beneath the adhesive layer and attached to a lower side of the surface layer by the adhesive layer; and
   a UV coating layer formed on top of the surface layer.

2. The reinforced wood flooring according to claim 1, wherein the wood sheet has a thickness ranging from 0.3 mm to 1.0 mm.

3. The reinforced wood flooring according to claim 1, wherein the resin-impregnated paper sheet is a phenol-impregnated paper sheet or a melamine-impregnated paper sheet.

* * * * *